United States Patent [19]
Asahara et al.

[11] 3,841,739
[45] Oct. 15, 1974

[54] USE OF CU-AS-SE GLASS TO TRANSMIT LONG WAVELENGTH RADIATION

[75] Inventors: Yoshiyuki Asahara, Kanagawa; Tetsuro Izumitani, Tokyo, both of Japan

[73] Assignee: Hoya Glass Works, Ltd., Tokyo, Japan

[22] Filed: Apr. 27, 1973

[21] Appl. No.: 354,975

[30] Foreign Application Priority Data
Oct. 2, 1972    Japan.............................. 47-98807

[52] U.S. Cl............... 350/320, 106/47 R, 252/300, 350/1
[51] Int. Cl. .......................... G03c 3/24, G02b 1/00
[58] Field of Search ....... 106/47 R; 350/1; 117/201, 117/106 A; 252/300; 65/134

[56] References Cited
UNITED STATES PATENTS
3,279,938   10/1966   Schneeberger ........................ 350/1
3,657,006   4/1972    Fisher et al. ................... 106/47 UX OTHER PUBLICATIONS
Rawson; H. Inorganic Glass-Forming Systems (1967) Academic Press, N.Y., TP857R3, p. 268.
Savan, et al., Y. Chemabstracts 69 (1968) item 70736t p. 6613.
Savage et al. Phys & Chem of Glasses 5(3) June 1964 pp. 82–86, "Preparation of Glasses Transmitting in the Infra-Red Between 8 and 15 Microns".
Savan, et al., Ya Akademia nauk. SSSR. Isvestiya, Neorganicheskae Materialy. Vol. 5, No. 3, 1969 pp. 492–497.

Primary Examiner—Helen M. McCarthy
Attorney, Agent, or Firm—Sughrue, Rothwell, Mion, Zinn & Macpeak

[57] ABSTRACT

An infrared transmitting glass produced by adding Cu to a chalcogenide glass in an amount of 12 – 40 atomic percent of the latter.

1 Claim, 1 Drawing Figure

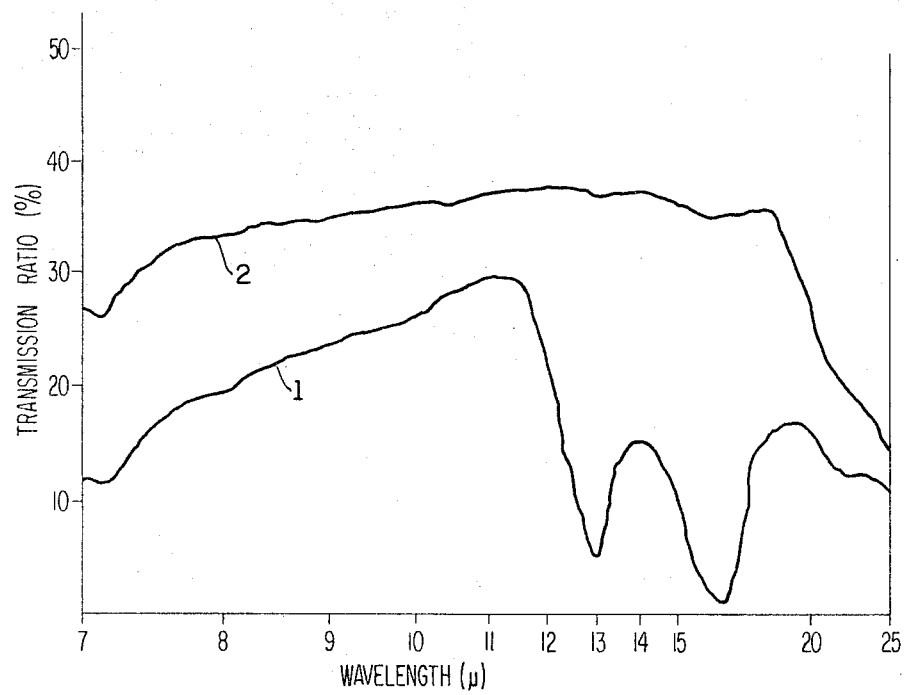

USE OF CU-AS-SE GLASS TO TRANSMIT LONG WAVELENGTH RADIATION

BACKGROUND OF THE INVENTION

1. Field of the Invention

This invention relates to an infrared transmitting glass, and more particularly to a glass having a long wavelength transmitting edge of 20 $\mu$.

2. Description of the Prior Art

Known chalcogenide glasses containing the chalcogen elements transmit light of long wavelengths well as compared with known oxide glasses which have a 7 $\mu$-transmitting edge at the longer wavelength side. As-Se or Ge-As-Se glasses especially transmit light having a wavelength shorter than 15 $\mu$. These two glasses are very stable and exhibit good chemical durability.

However, various oxides are present in chalcogenide glasses which inhibit the transmission of infrared rays. More particularly, As is easily oxidized and causes absorption near 12.8 $\mu$ and 16 $\mu$ which is due to the formation of As oxide, so that the infrared transmitting edge of the chalcogenide glass, at the long wavelength side, usually about 20 $\mu$, is shifted to the short wavelength side. Therefore, the refining of the As-containing material to be added to the glass composition and the control of the melting and forming processes are necessary for the production of As-containing chalcogenide glasses, although As increases the softening point, the thermal strength and the chemical durability of the resulting glass.

SUMMARY OF THE INVENTION

This invention is based on the discovery that the addition of Cu to a chalcogenide glass reduces the absorption light in the neighbor of 12.8 $\mu$ and 16 $\mu$ in a chalcogenide glass. If 12 – 40 atomic percent of Cu is added to the chalcogenide glass, the infrared transmitting edge at the longer wavelength side increases to 20 $\mu$, and the necessary critical control of the refining, melting and forming of the raw material can be eliminated. In addition, the softening point of the resulting glass can be increased and the thermal properties are improved.

BRIEF DESCRIPTION OF THE DRAWING

The FIGURE shows the relationship between relative transmission of light and the wavelength of the light, where curve 1 shows the relationship for a Cu-free As-Se glass and curve 2 shows the relationship for an As-Se glass containing 25 atomic % Cu.

DETAILED DESCRIPTION OF THE INVENTION

The amount of Cu is restricted in the above described range of 12 – 40 atomic percent for the following reason. If the Cu content in the chalcogenide glass is not more than 12 atomic percent, the effect of the Cu addition to increase the transmission near 12.8 $\mu$ and 16 $\mu$ is not fully realized. On the other hand, more than 40 atomic percent of Cu introduced into the chalcogenide glass causes the glass to be unstable.

Observing the above limits on the Cu, preferred glasses contain 25 to 60 atomic percent As and 25 to 60 atomic percent Se.

As is known in the art, the chalcogenide glasses are those which contain at least one of S, Se and Te.

Some examples of the effect of the Cu addition to the chalcogenide glass will be shown in the following Table with reference to an As-Se glass.

| Specimen No. | Composition (atomic %) | | | Softening point (°C) | Percent transmission | | Thickness of the specimen (mm) |
|---|---|---|---|---|---|---|---|
| | As | Se | Cu | | 12.8$\mu$ | 16.0$\mu$ | |
| 1 | 40 | 60 | — | 210 | 0 | 0 | 0.772 |
| 1' | 40 | 60 | — | do. | 5.0 | 1.0 | 0.191 |
| 2 | 50 | 50 | — | 200 | 0 | 0 | 0.773 |
| 2' | 50 | 50 | — | do. | 3.5 | 1.5 | 0.297 |
| 3 | 60 | 40 | — | 150 | 0 | 0 | 0.734 |
| 4 | 36 | 54 | 10 | 195 | 1.7 | 0.2 | 0.665 |
| 5 | 28 | 42 | 30 | 225 | 11.0 | 7.0 | 0.665 |
| 6 | 26 | 39 | 35 | 235 | 8.0 | 4.6 | 0.815 |
| 7 | 32 | 48 | 20 | — | 23.0 | 16.0 | 0.173 |
| 8 | 55 | 30 | 15 | — | 38.0 | 34.0 | 0.240 |
| 9 | 45 | 30 | 25 | — | 37.0 | 35.0 | 0.285 |
| 10 | 35 | 35 | 30 | — | 33.0 | 30.3 | 0.277 |

Specimens 1 – 4 are comparative glass compositions, and specimens 5 – 10 are glass compositions according to this invention.

The percent transmission of each glass specimen is measured at 12.8 $\mu$ and at 16.0 $\mu$. The test results show that the transmission increases when the Cu content exceeds 10 atomic percent.

In the drawing, curve 1 shows the relationship between the transmission ratio and the wavelength of the light for Specimen 1', and curve 2 shows the relationship for Specimen 9. It will be apparent from these two curves that the absorption of the light at 12.8 $\mu$ and at 16.0 $\mu$ is extinguished by the Cu addition. In addition, it is apparent that the softening point of the glass gradually increases and the thermal properties improve with increase of the Cu content, (e.g., compare Specimens 1 and 4 with Specimens 5 and 6).

Each specimen was produced by charging a mixture of unrefined ingredients, i.e., As (99.9 percent pure), Cu (99.99 percent pure) and Se (99.99 percent pure), into an evacuated quartz tube, melting the mixture therein at 800°– 900°C for 2 – 3 hr., cooling in atmospheric air and then taking the product out of the quartz tube and grinding the cooled glass to the desired thickness.

Although this invention has been described with reference to the preferred embodiments thereof, it will be understood to one skilled in the art that the numerous modifications may be made without departing from the scope and spirit of this invention.

What is claimed is:

1. The process of using a glass consisting of 12–40 atomic percent of Cu, 25–60 atomic percent of As and 25–60 atomic percent of Se to transmit infrared radiation at 12.8 and 16 microns and up to a transmitting edge of 20 microns.

* * * * *